(12) United States Patent
Shelton et al.

(10) Patent No.: US 10,097,434 B2
(45) Date of Patent: Oct. 9, 2018

(54) INTELLIGENT APPLICATION DIAGNOSTICS

(71) Applicant: T-Mobile USA, Inc., Bellevue, WA (US)

(72) Inventors: Timothy Adam Shelton, North Bend, WA (US); Brandon Shurick, Gig Harbor, WA (US); Boua Lor, Renton, WA (US); Jonathan Regalado, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 267 days.

(21) Appl. No.: 15/019,921

(22) Filed: Feb. 9, 2016

(65) Prior Publication Data

US 2017/0230263 A1    Aug. 10, 2017

(51) Int. Cl.
*G06F 15/16* (2006.01)
*H04L 12/26* (2006.01)

(52) U.S. Cl.
CPC .......... *H04L 43/0817* (2013.01); *H04L 43/12* (2013.01)

(58) Field of Classification Search
CPC ............................ H04L 43/0817; H04L 43/12
USPC .................................................. 709/203–248
See application file for complete search history.

(56) References Cited

U.S. PATENT DOCUMENTS

| | | | | |
|---|---|---|---|---|
| 6,141,686 A * | 10/2000 | Jackowski | ............ | H04L 41/065 709/206 |
| 8,141,079 B2 * | 3/2012 | Sreedharan | ........... | G06F 9/4887 718/100 |
| 8,171,545 B1 * | 5/2012 | Cooley | ................ | G06F 21/552 726/22 |
| 8,359,389 B1 * | 1/2013 | Cohen | ..................... | H04W 4/20 705/23 |
| 9,767,285 B2 * | 9/2017 | Mulchandani | ........ | G06F 21/566 |
| 2005/0278703 A1 * | 12/2005 | Lo | ....................... | G06F 11/0709 717/126 |
| 2008/0139197 A1 * | 6/2008 | Misra | ...................... | H04L 43/12 455/423 |
| 2009/0089139 A1 * | 4/2009 | Rojas-Cessa | ...... | G06Q 10/0631 705/7.12 |
| 2013/0205001 A1 * | 8/2013 | Reed | ..................... | G06F 9/4418 709/224 |
| 2014/0122632 A1 * | 5/2014 | Yamauchi | ............... | H04L 67/04 709/208 |
| 2015/0032867 A1 * | 1/2015 | Lihosit | .................. | H04L 41/082 709/221 |
| 2015/0120906 A1 * | 4/2015 | Dowling | ............. | G06F 11/3409 709/224 |

(Continued)

*Primary Examiner* — Moustafa M Meky
*Assistant Examiner* — Thorne E Waugh
(74) *Attorney, Agent, or Firm* — Han Santos, PLLC

(57) ABSTRACT

System and method of intelligent application diagnostics of a user device (UD). Upon every first time period, the key performance indicators (KPI's) of the processes running on the UD are determined. The top predetermined number (N) of processes that are using the most computing resources are filtered and their KPI's are stored in a local memory. The KPI's of the remaining processes are discarded. This process is repeated at every first time period. At every second time period, the filtered KPI's of every iteration of the first time period are retrieved from the local memory and sent to a remote monitoring server for analysis and storage. The filtered metrics are removed from the local memory.

20 Claims, 4 Drawing Sheets

(56) References Cited

U.S. PATENT DOCUMENTS

| | | | |
|---|---|---|---|
| 2015/0172140 A1* | 6/2015 | Habdank | H04L 43/00 |
| | | | 709/224 |
| 2016/0173641 A1* | 6/2016 | Broussard | H04L 43/0876 |
| | | | 709/224 |
| 2016/0274990 A1* | 9/2016 | Addleman | G06F 11/3409 |
| 2016/0327943 A1* | 11/2016 | Lee | H02J 7/00 |
| 2016/0378578 A1* | 12/2016 | Nandakumar | G06F 9/44505 |
| | | | 719/328 |
| 2017/0188257 A1* | 6/2017 | Gibbon | H04W 4/029 |

* cited by examiner

INTELLIGENT APPLICATION DIAGNOSTICS

BACKGROUND

In recent years there has been tremendous growth in the number of applications for mobile devices. According to at least one source, app usage increased by 76% in 2014 alone. Application categories include shopping, productivity, utilities, messaging, games, etc. Unlike restrictive platforms, such as vehicles that have a software infrastructure that is more tightly controlled, the plethora of apps that are available for mobile devices suffers from a lack of meaningful quality control.

Users of mobile devices are generally more interested about the features that the app provides and may not be concerned or even aware of the efficiency of the app. For example, some apps may be very resource heavy or simply poorly written, contributing to heavy resource usage, such as memory, processing power, battery, bandwidth, etc., ultimately leading to a quick depletion of the battery or even early degradation of the mobile device. In some instances, the mobile device may appear sluggish and/or run at an elevated temperature. Another common consequence is the need for frequent charging.

Users experiencing such issues on their mobile device typically do not fault a particular app; rather, they attribute fault to the mobile device itself. Consequently, many of the mobile devices are returned because they are deemed to be defective or of poor quality. In at least one study, over 63% of returned mobile devices are found to have no fault, which costs the global industry $4.5 billion in replacement, refurbishment, and shipping costs.

While mobile device health monitoring applications exist, they generally evaluate all the harvested performance indicators at a remote server, which is time consuming and computing/network resources intensive.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure generally relates to determining the health of a computing device and more particularly to techniques for determining inefficient processes running on the computing device. A probe application that is generally in sleep mode is activated at a first predetermined period to harvest key performance indicators (KPI's) of the processes running on the computing device. A filtration is performed to only retain the most relevant (i.e., most resource intensive) processes and the KPI's for the rest of the processes are discarded to lighten the overall processing, memory, and networking load. Upon local storage, the probe application returns to sleep mode. The harvesting of the KPI's continues at every first period. The stored KPI's are sent for to a remote server for processing only at every second period, which is substantially longer than the first period. By virtue of limiting the determination of the various KPI's to the first predetermined time period and by performing substantial filtration prior to sending the KPI's to the remote server for analysis and storage, the task of determining the health of the apps on the computing device is lightened.

The techniques described herein may be implemented in a number of ways. Example implementations are provided below with reference to the following figures.

Example Network Architecture

Figure 1:
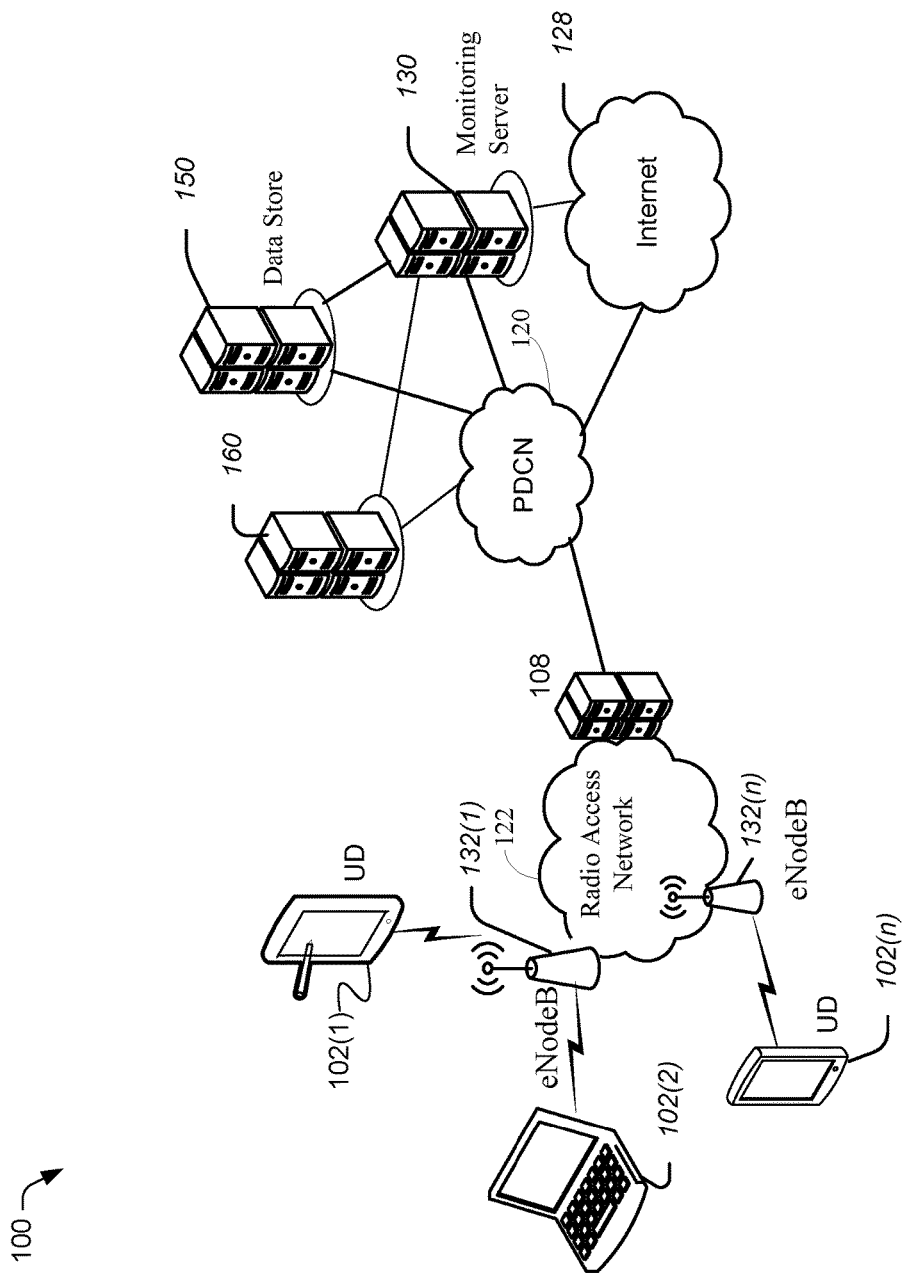
FIG. 1 illustrates an example architecture for implementing an intelligent application diagnostic system.

FIG. 1 illustrates an example architecture for implementing an intelligent application diagnostic system. FIG. 1 illustrates a mobile communication network 100 as may be operated by a carrier or service provider to provide a wide range of mobile communication services and ancillary services or features to its subscriber customers and associated mobile device users. The elements generally indicated by the reference numeral 100 are elements of the mobile communication network and are operated by or on behalf of the carrier. The mobile communication network 100 provides communications between various user device (UD), such as 102(1) to 102(n), as well as communications for the UD with networks and stations outside the mobile communication network 100.

For purposes of later discussion, several UD's appear in the drawing, to represent some examples of the devices that may receive various services via the radio access network 122. Today, UD's typically take the form of portable handsets, smart-phones, tablet computers, personal digital assistants (PDAs), and smart watches, although they may be implemented in other form factors, including consumer, business, and medical electronic devices.

The mobile communication network 100 provides communication for UD 102(1) to 102(n), as well as for mobile devices that do not participate in the intelligent application diagnostic system described herein. Mobile communication network 100 allows users of the UD's (e.g., customers or subscribers to the radio access network 122) to initiate communication, and receive information from the packet data communication network (PDCN) 120.

The mobile communication network 100 typically is implemented by a number of interconnected networks. Hence, the overall communication network 100 may include a number of Radio Access Networks (RANs) 122, as well as regional ground networks interconnecting a number of RANs and a wide area network (WAN) interconnecting the regional ground networks to core network elements, such as the Multimedia Messaging Service Centers (MMSCs). A regional portion of the network 100, such as that serving UD's 102(1) to 102(n) may include one or more RANs (represented by the radio access network 122) and a regional circuit and/or packet switched network and associated signaling network facilities.

Physical elements of a RAN 122, operated by one of the mobile service providers or carriers, include a number of base stations, represented in the example of FIG. 1 by an eNodeB 132(1) or 132(n) node. Such eNodeB 132(1) to 132(n) nodes may include a base transceiver system (BTS) that communicates via an antennae system at the site of the node and over the air-link with one or more of the UD's (102(1) to 102(n)) when the UD's are within range. Each eNodeB 132 node may include a BTS coupled to several antennae mounted on a radio tower within a coverage area often referred to as a "cell." The BTS is the part of the radio network that sends and receives RF signals to/from the UD's that the eNodeB node 132 currently serves.

The radio access network 122 carries the user communications for the UD's between the respective eNodeB 132 nodes and other elements with or through which the UD's communicate. Individual elements such as switches and/or routers forming the radio access network 122 are omitted here for simplicity. It will be understood that the various network elements can communicate with each other, as well as other aspects of the radio access network 122, and other networks (e.g., the public switched telephone network (not shown) and the Internet 128 either directly or indirectly.

The service provider of the RAN 122 may also operate a number of systems that provide ancillary functions in support of the communications services and/or application services provided through the RAN 122, and those elements communicate with other nodes or elements of the RAN 122, such as one or more private IP type packet data networks 120 based on a packet data communication network (PDCN), sometimes referred to as an Intranet, (i.e., a private network).

Generally, such systems are part of, or connected for, communication via the private network 120 and may provide additional services such as monitoring the UD via a monitoring server 130 and a data store 150, which may be coupled for communication via the private network 120. In one example, there is an account resource management (CRM) server 160 that offers its account holders (e.g., user of a UD and/or the intelligent application diagnostic service) on-line access to a variety of functions related to the account holders' account, such as on-line payment information, subscription changes, where and/or to whom the notification information is to be provided (e.g., to the account holder, application provider, system administrator, etc., and via SMS, e-mail, regular mail, etc.), password control, and the like. The CRM server 160 may include subscription related information about the intelligent application diagnostic service (e.g., what the account holder preferences are). The CRM server 160 may provide the user an interface via the Internet 128 to access the account information. Hence, a user's terminal, such as PC, may be used to access on-line information about a UD's user's account, which the radio access network carrier makes available via the carrier's web site, accessible through the Internet 128.

In the example of FIG. 1, there is a remote monitoring server 130 that is configured to receive key performance information (KPI) of the most resource intense processes running on the UD 102(1) to 102(n), as well as other information. The monitoring server 130 receives the information from the respective UD at a predetermined time intervals (e.g., once per day) in the form of a data package. In various embodiments, the data package may include identification (ID) information of the respective UD, KPI performance data retrieved from the cache of the UD, and other metrics related to the most resource intense processes running on the UD. The monitoring server 130 provides validation functions of both the identity of the UD 102(1) to 102(n), as well as the data received therefrom.

In at least one embodiment, mobile communication network 100 includes a data store 150 where the KPI's and other metrics are stored for subsequent processing and analysis. In various embodiments, the data store 150 may include historic information, including KPI's and other performance metrics, related to different known processes that typically run on various UD's. Data store 150 includes known problems associated with such processes. The stored historic data not only provides a baseline for performance metrics, but also a lookup table for known or suspected problems.

In one embodiment, the monitoring server 130 together with the data store 150 perform machine learning to construct algorithms that can learn from and make predictions based on the data stored in the data store 150. Such algorithms operate by building a model from stored prior inputs or baselines therefrom in order to make data-driven predictions or decisions. In one embodiment, these algorithms are used to provide threshold conditions to indicate a malfunctioning or inefficient process, rather than following strictly static criteria.

For example, based on the machine learning, patterns are identified trends (e.g., from the harvested KPI's and other metrics). Any outliers from the identified patterns and trends are identified as a problem process. In one example, if a threshold number of UD's are experiencing performance problems in one network area, then that area itself may be considered as malfunctioning (i.e., and not the UD or the process running on the UD). Put differently, an area may be identified to be experiencing a problem and may be included on an "exceptions list." Thus, even if the process on a UD is consuming resources that are above a predetermined threshold, the process will still not be deemed to be problematic. That is because the monitoring server 130 had determined the area to be problematic (e.g., has interference or not enough base stations) and is therefore on the exceptions list.

In various embodiments, the machine learning discussed herein may be supervised or unsupervised. In supervised learning, the monitoring server may be presented with example data from the data store 150 as being acceptable. Put differently, the data store 150 acts as a teacher for the monitoring server 130. In unsupervised learning, the data store 150 does not provide any labels as what is acceptable, rather, it simply provides historic data to the monitoring server 130 that can be used together with the recently harvested data (e.g., KPI) from the UD to find its own structure among the data.

Accordingly, the monitoring server 130, together with the information from the data store 150, is configured to determine trends and patterns of performance for the top resource consuming processes (e.g., apps) that are running on a UD (e.g., 102(1)). In one embodiment, if a process is determined to be malfunctioning or inefficient (e.g., consuming UD resources that are above a predetermined threshold) then a notification may be sent by the monitoring server 130 to an appropriate user device of a recipient (e.g., UD account holder, system administrator, app provider, etc.). In one embodiment, the appropriate recipient may be provided to the monitoring server 130 by the CRM 160, based on previously stored personal preferences for the account holder.

In various embodiments, the notification may be via SMS, text, telephone, e-mail, or any other appropriate technology, over the PDCN 120 and/or RAN 122. For example, a message may appear on the display of the UD 102(1) with a notification that the UD 102(1) is not operating optimally because of the problematic process (e.g., application) with a suggestion to turn the app OFF. In one embodiment, the notification from the monitoring server may include a recommendation for a different version or a different app altogether that provides similar functionality but is known not to be as resource intensive.

For example, the UD 102(1) may be running a navigation app that is using a substantial amount of resources, such as global positioning system (GPS), central processing unit (CPU) power, memory, etc. The app is quickly depleting the battery and generally slowing down the performance of the UD 102(1). Upon determining that the UD 102(1) is running this navigation app, the monitoring server 130 determines from the data store 150 whether there is an alternative navigation program that could better accommodate the particular model of the UD 102(1). If so, the monitoring server 130 sends a message to the UD 102(1) with a suggestion of an alternate navigation tool.

In various embodiments, such notifications may be pushed to the UD 102(1) at a predetermined time (e.g., notifications are sent every other hour) or immediately upon determination by the monitoring server 130 that the app is consuming too many resources. Advantageously, an incorrect conclusion by the user that the UD 102(1) is malfunctioning is prevented, thereby improving customer relations with the user.

While the monitoring server 130, the data store 150, and the CRM 160 are illustrated by way of example as separate servers, they may be implemented on different hardware platform combinations. Thus, the functionality described herein with respect to each of the servers 130, 150, and 160 can also be provided by one or multiple different computing devices. In other words, the monitoring server 130, data store 150, and CRM 160, need not be a stand-alone computing devices but can be combined in various configurations. In one embodiment, the monitoring server 130 and the data store may have a scalable and fault-tolerant architecture, such as a lambda architecture (LA). Such architecture can handle large quantities of data by using both batch and stream processing approaches.

Example User Device Components

Figure 2:
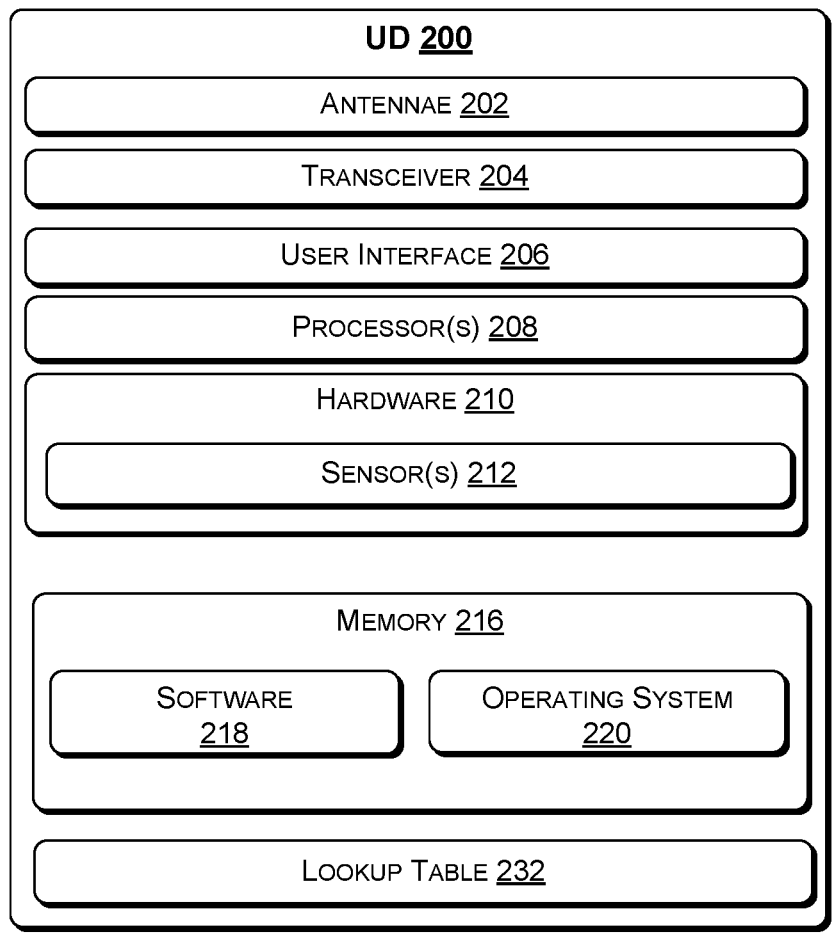
FIG. 2 is a block diagram showing various components of an illustrative user device.

FIG. 2 is a block diagram showing various components of an illustrative UD. As discussed in the context of FIG. 1, the intelligent application diagnostics discussed herein involves an interaction with an appropriately configured UD. It may be useful to consider the functional elements/aspects of an exemplary UD, at a high-level. For purposes of such a discussion, FIG. 2 provides a block diagram illustration of an exemplary UD 200. It will be understood that the UD 200 may be a handset type mobile phone or may be incorporated into another device, such as a personal digital assistant (PDA), a tablet computer, or the like. For discussion purposes, the illustration shows the UD 200 in the form of a handheld smart-phone.

The UD 200 may include one or more antennae 202, transceiver 204, user interface 206, one or more processors 208, hardware 210, one or more sensors 212, and memory 216.

In some embodiments, the antennae 202 include an uplink antenna that sends radio signals to a radio tower (e.g., 132 in FIG. 1), and a downlink antenna that receives radio signals from the radio tower. In other embodiments, a single antenna may both send and receive radio signals. These signals may be processed by a transceiver 204 that is configured to receive and transmit data. In one embodiment, the UD 200 may not have an antenna 202. Instead, communication is provided via a wired interface directly through the transceiver 204.

In one embodiment, the UD 200 includes a user interface 206 that enables a user to provide input and receive output from the UD 200. For example, the user interface 206 may include a data output device (e.g., visual display, audio speakers, haptic device, etc.) that may be used to display notifications monitoring server 130. The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces.

The UD 200 may include one or more processors 208, which may be a single-core processor, a multi-core processor, a complex instruction set computing (CISC) processor, or another type of processor. The hardware 210 may include a power source and digital signal processors (DSPs), which may include single-core or multiple-core processors. The processors may perform operation in parallel to process a stream of data that may be provided by probe application and/or operating system 220.

The hardware 210 may also include network processors that manage high speed communication interfaces, including communication interfaces that interact with peripheral components. The network processors and the peripheral components may be linked by switching fabric. The hardware 210 may further include hardware decoders and encoders, a network interface controller, and/or a universal serial bus (USB) controller.

The network interface controller may enable the processors to transmit and receive data via the radio access network of FIG. 1. In some embodiments, the hardware 210 may also include a direct memory access (DMA) engine. The DMA engine may enable the various controllers to access the memory 216 independently of the one or more processors 208 to perform tasks. The various controllers and processors of the UD 200 may execute instructions and perform tasks under the direction of software components that are stored in the memory 216.

The hardware 210 of the UD 200 may include one or more sensors 212 that are configured to measure the performance of the UD 200. In various embodiments, the one or more sensors may monitor temperature, current consumption, battery charge, bandwidth usage, memory usage, CPU usage, etc. The data harvested by the sensor(s) 212 is sent by the transceiver 204 to the monitoring server 130.

The memory 216 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various software components that are executable or accessible by the processors 208 and controllers of the UD 200. The various components may include software 218 and an operating system 220. Each module may include routines, program instructions, objects, and/or data structures that perform particular tasks or implement particular abstract data types. The memory 216 may include cache memory that may be RAM that works closely with the processor for quick access.

The software 218 may enable the UD 200 to perform functions and control hardware components, including the sensors 212, of the UD 200. In various embodiments, the software 218 may include a probe application that is configured to provide various functions, including instructing the UD 200 (e.g., operating system 220) monitoring intervals to determine the KPI's of the processes (e.g., applications) running on the UD 200. Put differently, the probe application provides the timing information to the operating system, such that the probe application is woken up at predetermined time intervals (e.g., Periods) to perform various performance monitoring functions. Further, the probe application is configured to determine the top N processes that are running on the UD 200 that are consuming the most resources. Still further, the probe application runs one or more algorithms that support the determination of an aggregate performance assessment of each process that is running on the UD 200. The probe application of the software 218 block also acts as an interface between the remote monitoring server 130 and the UD 200.

The operating system 220 may include components that enable the UD 200 to receive and transmit data via various interfaces (e.g., user interface 206, communication interfaces, etc.). The operating system 220 may also receive instructions from the probe application, harvest at least some of the KPI's of the processes running during and/or at predetermined time periods using the one or more processors 208, based on the instructions received from the probe application. For example, the operating system 220 may provide an execution environment for the execution of the software 218 and other software applications. Additionally, the operating system 220 may include other components that perform various other functions generally associated with an operating system.

Example Call Flow Process

Figure 3:
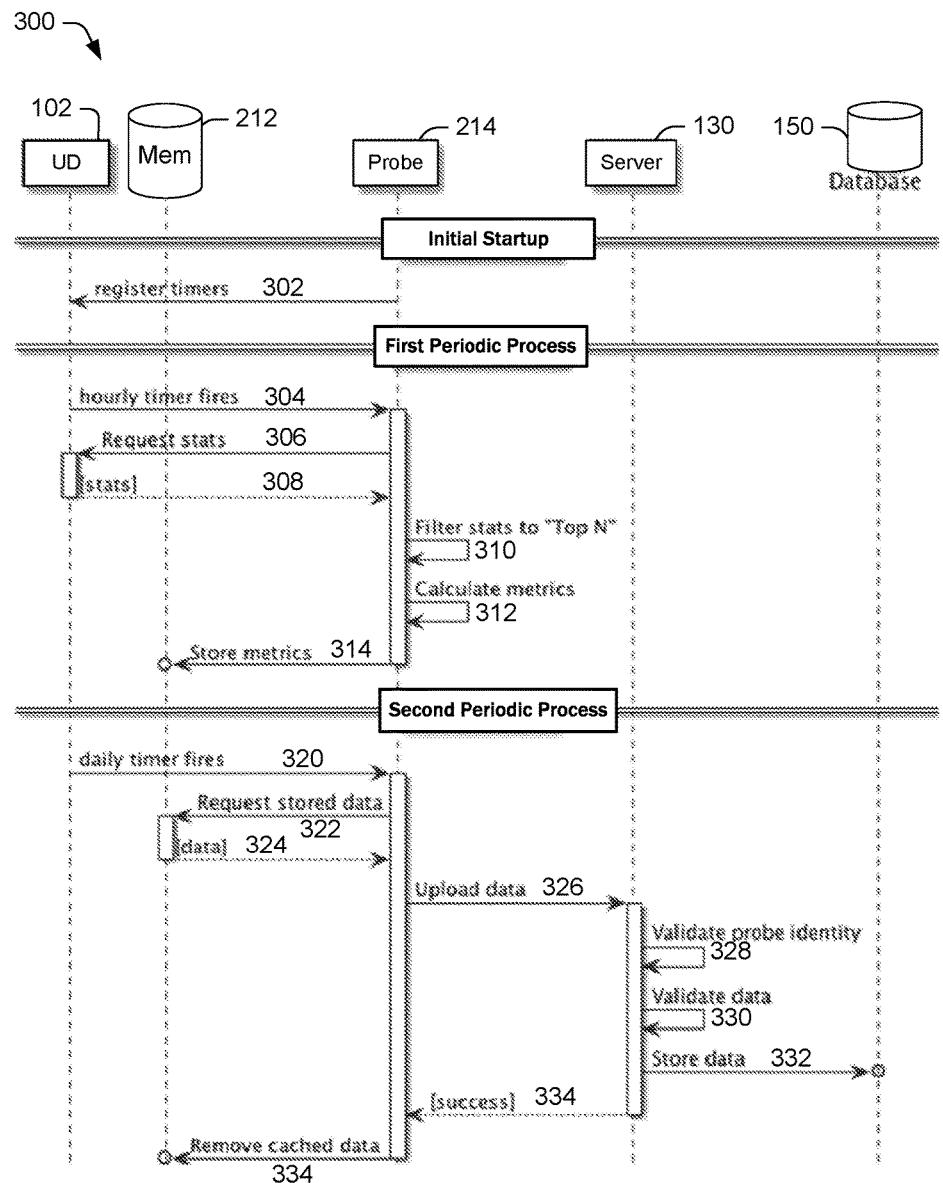
FIG. 3 is an example call flow process of an intelligent application diagnostics.

With the foregoing overview of the mobile communication network 100 and the various components of the UD 200, it may be helpful now to consider high-level discussions of an example call flow process. To that end, FIG. 3 presents an illustrative process 300 for an intelligent application diagnostics. The process 300 is illustrated a logical flow, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 300 is described with reference to the architecture of the mobile communication network 100 of FIG. 1 and the UD of FIG. 2.

To facilitate this discussion, the call flow process 300 has been divided into an initial startup phase, a first period process, and a second period process. During initial startup (e.g., when the UD is activated), a program that is stored on the UD, referred to herein as a probe application, is activated. At step 302, the probe application provides the UD 102 timing information based on a first time period and a second time period. The first time period is the interval at which the key performance indicators (i.e., of the applications that are running on the UD 102) are determined. For example, the probe application 214 provides the trigger information (e.g., timing instructions) to the operating system 220 of the UD 102. Put differently, the probe application 214 specifies to the operating system 220 of the UD 102 when the probe application 214 is to be woken up to determine various KPI's of active processes on the UD 102.

In various embodiments, a first time period provided by the probe application 214 may be any suitable time period that balances the consumption of UD 102 resources to run the probe application and determine the KPI's—with a desired sampling resolution. The second time period is generally longer than the first time period. In one embodiment, the second time period is a multiple of the first time period. In the example of call flow process 300, it will be assumed that the first time period is one hour and the second time period is 24 hours, while it will be understood that other first and second time periods may be used as well.

Upon sending the timer information to the UD 102, the probe application 214 enters a standby mode, sometimes referred to herein as being "OFF." In various embodiments, some of the KPI's may be automatically determined by the operating system 220 while others are initiated by the probe application at the beginning of the first time period. By virtue of limiting the determination of various KPI's to the predetermined first time interval (e.g., instead of running continuously in the background), the probe application does not use a substantial amount of UD 102 resources, such as computing power and memory. Thus, the probe application is not a substantial resource consuming process itself and therefore does not suffer from the so called "observer effect," where the act of observation creates a phenomenon being observed.

Upon the timer of the UD 102 reaching the first time period, at step 304, the UD 102 activates the probe application 214 to receive instructions therefrom.

At step 306, the probe application 214 sends a requests to the UD 102 to determine the KPI's of the processes presently running on the UD 102. In response, at step 308, the KPI's are determined and forwarded to the probe application 214.

At step 310, the probe application analyzes the data and runs an algorithm to determine the top predetermined number (N) processes that are running on the UD 102 that are using the most resources. In various embodiments, the resources considered may be memory, CPU, Wi-Fi bandwidth, data, Bluetooth, GPS, current, etc., or any combination thereof. The KPI's of the top N (e.g., 10) processes that consume the most resources are kept (i.e., stored in the memory 216) and the KPI's of the remaining processes are discarded, thereby substantially lightening the subsequent analysis.

At step 312, an algorithm may be used to determine a universal consumption factor (UCF) for each process. An example algorithm is discussed in detail in a later section. In various embodiments, the UCF for each active process may be determined before step 310 or thereafter (e.g., steps 310 and 312 are interchangeable). One advantage in determining the UCF before filtration (i.e., to the top N processes) is that the UCF provides a better aggregate performance assessment of each process than simply evaluating single KPI's of a process, such as CPU or memory usage. On the other hand, calculating the UCF for each (remaining) process after the filtration, substantially reduces the number of calculations that are performed (i.e., only N calculations are performed instead of a calculation for all processes). For example, if the filtration step only retains the KPI's of the top 10 processes, only 10 UCF calculations via the algorithm are made thereafter. However, if the UCF step is performed before the filtration, every process (which may be in the hundreds) is subject to the UCF calculation.

In at least one embodiment, there is an optional step where the processes are compared to a locally stored (i.e., on the UD 102) lookup table with processes that are deemed to be exceptions. For example, exceptions may include processes that are known to be resource intensive but are regarded as presently acceptable (e.g., they do not have a known alternative). In one instance, a resource intensive process may be a movie streaming app, which may be included in the reference table as an acceptable resource intensive process. To that end, if the movie streaming app is part of the top N processes after filtration, the KPI's harvested with respect to this process are discarded upon comparison with the lookup table. Thus, additional analysis is not performed, thereby saving valuable process monitoring resources.

At step 314, the remaining (i.e., N) filtered metrics (e.g., KPI's and UCF) are stored in the memory (e.g., cache) 216 of the UD 102. Upon storage, the probe application is again turned OFF. Steps 304 to 314 are repeated at every occurrence of the first time period.

At step 320, upon the timer (e.g., of the operating system 220) of the UD 102 determining that the second time period arrived, the UD 102 activates the probe application 214 to receive instructions therefrom.

At steps 322 and 324, respectively, the probe application request and receives stored KPI data from the memory 216 of the UD 102. In one embodiment, additional data points are provided for KPI's that are determined by the operating system 220 during the first time period. Put differently, some of the KPI's are triggered by the probe application at every first time period, while other KPI's may be harvested during the first time period by the operating system 220.

At step 326, a data package is sent by the probe application 214 to the remote monitoring server 130. In various embodiments, the data package may include UD 102 identification (ID) information, the KPI performance data retrieved from the memory 216, and/or the UCF metrics for the stored processes. The data package may be encrypted (e.g., for security purposes and to meet FCC guidelines).

At steps 328 and 330, respectively, the server 130 validates the probe application 214 identity based on the ID information and validates the KPI data and/or the UCF metrics received.

For example, in the probe application identity step 328, the network identity is combined with the device ID to assure that the UD is what it purports to be. To that end, a keyed-hash message authentication code (HMAC) may be used to calculate a message authentication code (MAC) involving a cryptographic hash function in combination with a secret cryptographic key from the UD 102. The cryptographic key may change in each transmission of the data, thereby making the date particularly secure. The HMAC may be used to verify the data integrity and the authentication of the message. In one embodiment, the probe application identity step 328, includes two way authentication to validate the identity of the UD 102. Using two way authentication is particularly useful in situations where the data is security sensitive.

Further, at step 330, the data is decrypted prior to validation. Thus, upon decryption, the server 130 determines whether the information provided is valid. If the data received exceeds predetermined threshold limits, it is deemed unreliable and may be discarded. Whether the received data is reliable can be determined in various ways. For example, the data may be compared to a reference table (e.g., of the monitoring server 130 and/or the data store 150). If the KPI and/or UCF are not within predetermined threshold limits, then the KPI data point is considered not valid. In one embodiment, data points that are outside the ±3 sigma distribution range are discarded as unreliable.

At step 332, the KPI data and/or the UCF metrics are sent by the monitoring server 130 to the data store 150 for storage and analysis, which may include machine learning.

In one embodiment, in optional step 334, the monitoring server 130 notifies the probe application 214 of the UD 102 that the received KPI and/or UCF metrics were successfully received and validated by the monitoring server 130 and stored at the data store 150.

At step 336, the probe application 214 sends an instruction to the memory 216 of the UD 102 to remove the stored KPI and/or UCF metrics. In various embodiments, this instruction may be sent automatically after step 326 or upon receipt of the notification of step 334. Consequently, the probe application 214 turns OFF and the process continues with step 304.

Accordingly, monitoring of the health of the UD 102 is performed at predetermined intervals. The data is filtered to the top N most resource intensive applications, thereby significantly limiting the amount of data sent to the monitoring server 130 and ultimately the data store 150 for analysis and storage. Further, since the wireless transceiver of the UD is used for the purposes of transmitting the KPI and/or the UCF metrics at every (i.e., longer) second period, the power consumption of the UD 102 is reduced, as well as radio and network resources for the transmission.

Performance Metrics

In various embodiments, several metrics are collected to provide KPI's of each process running on the UD 102 during an evaluation stage. These include identification information and KPI's of each process (e.g., application).

In one embodiment four metrics are used to uniquely identify a version of an application, namely: (i) package identifier (ID), (ii) name, (iii) version code, and (iv) version name. For example, the package ID may be the identifier used by the Google Play Store and/or iTunes store. The name is simply the common name of the application (e.g., Facebook). The name is determined separately from the package ID because the same application is sometimes repackaged under a different name, even though it relates to the same code (i.e., package ID). The name may be based on the local language of the application (e.g., "Facebook" if English (en-US) or its corresponding Spanish equivalent if in Spanish (es-US)). The version code is a numeric value that defines the revision of the revision of the application. The version name is a text description of the version of the application. Together, these parameters uniquely identify a version of an application.

In various embodiments, different KPI's may be considered by the probe application discussed herein at the end of a first time period. One or more of the following metrics may be used:

Garbage Collection:

A count is performed to determine how many times a virtual machine performed in the first time period. Garbage collection refers to the process in which a virtual runtime environment reclaims memory that is no longer needed by the running processes. High garbage collection may indicate that the UD 102 is not performing optimally.

Application Launches:

A determination is made as to how many applications were launched and terminated during the first time period. Application launches may include the total processes running at the beginning of the first time period, the total processes running at the end of the first time period, the total number of applications launched during the first time period, the total number of applications terminated during the first time period, and/or the name of the top N number of applications terminated during the first time period.

Network Traffic by Application:

For example, the top N number of applications that used the most network resources are determined. The criteria may be based on the total bytes sent/received via Wi-Fi and/or the total bytes sent/received via the radio access network (RAN) 122 during the first time period.

Count and Duration of the Processes that Use Bluetooth Resources:

The name of the device that is connected to the UD 102, its MAC address, the start time of the connection, and the end time of the connection may be measured during the first time period.

Bluetooth Radio State:

The length of time the Bluetooth radio is active is calculated for the first time period. In particular, the start time, end time, the number of connections, the start time when the connected device was discoverable, and the end time when the device was discoverable may be determined.

RAN Access Network Usage:

The number of bytes received/sent, the type of radio connection (e.g., LTE, 4G, etc.), and the duration of the RAN 122 connection during the first time period is determined.

Screen Activity:

The duration of time the display of the UD 102 is active during the first period is determined. Generally speaking, screen activity may be one of the highest energy consumers of the UD 102.

Battery Performance:

The battery consumption during the first time period is determined. To that end, the delta between the battery charge at the beginning and the end of the first time period is calculated.

Universal Consumption Factor (UCF):

The UCF is a number that represents the aggregate resources used by a process running on the UD. It is one of the most efficient ways of determining the efficiency of a process based on a combination of parameters. Equation 1 below defines the parameters of an example UCF.

$$UCF = \left(\frac{\text{Process } CPU \text{ Time}}{UD\ CPU \text{ Time}}\right) \times 2 + \left(\frac{\text{Process Bytes}}{UD \text{ Bytes}}\right) \times \frac{1}{3}. \quad [\text{Eq. 1}]$$

Where:

Process CPU Time is the time the process uses the CPU during the first time period;

The UD CPU Time is the time the UD 102 uses the CPU during the first time period;

The Process Bytes is the total data sent and received by the process during the first time period; and The UD Bytes is the total data sent and received by the UD 102 during the first time period.

Accordingly, for a given time period (e.g., first time period), the UCF represents (e.g., applications') aggregate resource consumption of a process. Applicants have determined that Eq. 1 above provides a simple number that represents a total impact of a process on the battery consumption of the UD 102, which is an efficient way of determining an overall efficiency of a process. For example, Eq. 1 may be run on all processes to determine the UCF thereof. The processes may be ranked based on the UCF, where only the top N are stored and the KPI's for the remaining processes discarded. In one embodiment, the UCF is determined only for the top N processes. Put differently, the UCF for the processes are determined after filtration.

Example Computer Platform

As discussed above, functions relating to the intelligent diagnostics of processes running on a computing device (i.e., UD) can be performed on one or more computers connected for data communication via the components of a radio access network 122, including UD 102(1) to 102(*n*), monitoring server 130, data store 150, and CRM 160, as shown in FIG. 1 and in accordance with the call flow process of FIG. 3. An exemplary UD 200 has been discussed above with respect to FIG. 2. Although special purpose devices may be used as the server(s), such as servers 130, 150, and 160 in FIG. 1, such devices also may be implemented using one or more hardware platforms intended to represent a general class of data processing device commonly used to run "server" programming so as to implement the functions discussed above, albeit with an appropriate network connection for data communication.

Figure 4:
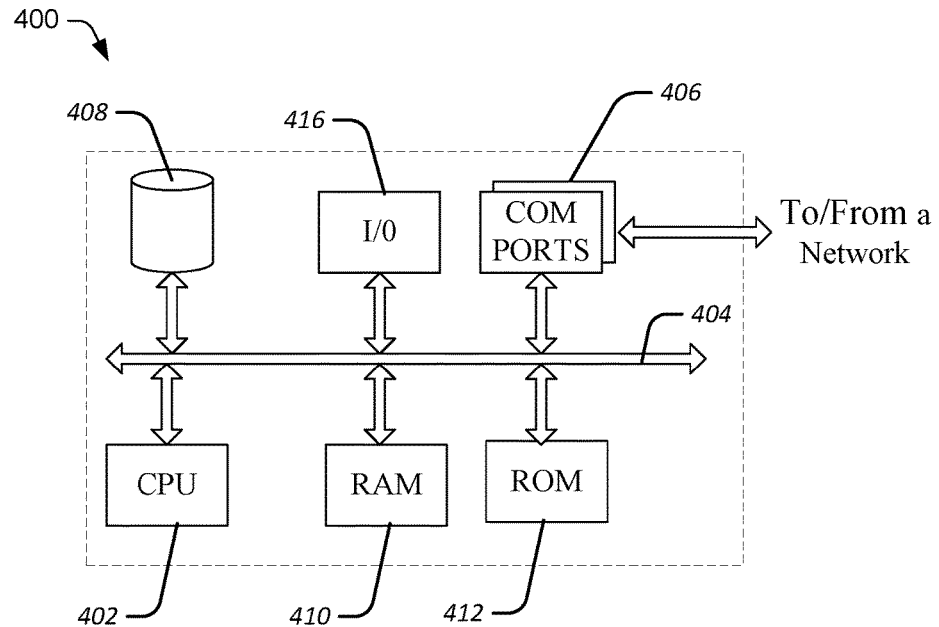
FIG. 4 illustrates a network or host computer that is used to implement an intelligent application diagnostic system.
Figure 5:
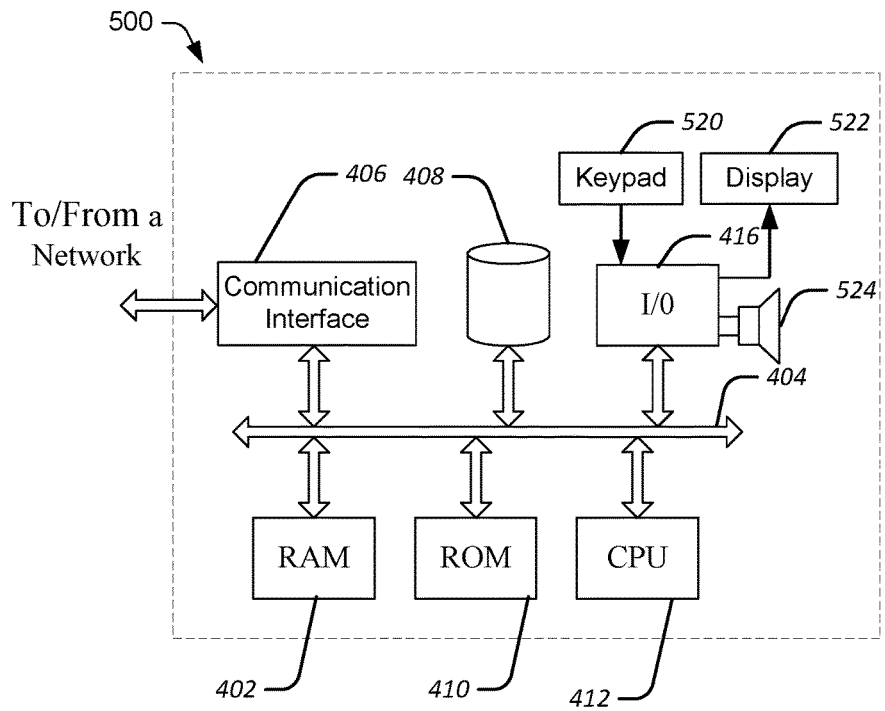
FIG. 5 illustrates a computer with user interface elements that is used to implement an intelligent application diagnostic system.

FIGS. 4 and 5 provide functional block diagram illustrations of general purpose computer hardware platforms 400, 500. FIG. 4 illustrates a network or host computer platform, as may typically be used to implement a server, such as the monitoring server 130, data store 150, or CRM 160. FIG. 5 depicts a device 500 with user interface elements 520, 522, (such as a keypad 520, display 522, and a speaker 524), as may be used to implement a personal computer or a workstation, or to implement a computing device, such as a portable handset, a smart-phone, tablet computer, a personal digital assistant or other type of UD of FIGS. 1 and 2, although the device of FIG. 5 may also act as a server if appropriately programmed. It is believed that the general structure and general operation of such equipment as shown in FIGS. 4 and 5 should be self-explanatory from the high-level illustrations.

A general purpose computer configured as a server, for example, includes a data communication interface 406 for packet data communication. The server computer also includes a central processing unit (CPU) 402, in the form of one or more processors, for executing program instructions. The server platform typically includes an internal communication bus 404, program storage and data storage for various data files to be processed and/or communicated by the server, although the server often receives programming and data via network communications. Data and/or programs can be stored in various forms of computer-readable media, including (but not limited to) hard disk 408, random access memory (RAM) 410, read only memory (ROM) 412, and the like.

The hardware elements, operating systems and programming languages of such servers are conventional in nature.

Of course, the server functions may be implemented in a distributed fashion on a number of similar platforms, to distribute the processing load. As discussed above, in various other embodiments, the functionality of the monitoring server 130, data store 150, and CRM 160 may be combined in one or more server platforms. In one embodiment, the monitoring server 130 in combination with the data store 150 represents a platform that allows the processing of big data.

The software functionalities involve programming, including executable code as well as associated stored data, e.g., files used for applications on the computing device to facilitate the monitoring of the processes running on the UD, as discussed herein.

The software code is executable by the computing device. In operation, the code is stored within the computing device. At other times, however, the software may be stored at other locations and/or transported for loading into the appropriate computing device system. Execution of such code by a processor of the computing device enables the computing device to perform functions of receiving data packages from the UD over the radio access network 122, analyzing the information, storing the information, providing notifications, etc., in essentially the manner performed in the implementations discussed and illustrated herein.

Hence, aspects of the methods of receiving and processing data as outlined above may be embodied in programming. Program aspects of the technology may be thought of as "products" or "articles of manufacture" typically in the form of executable code and/or associated data that is carried on or embodied in a type of non-transitory machine readable medium.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

It is understood that the determination of the KPI's and sending of the KPI's to the remote server for analysis and storage is performed upon subscriber approval.

It is understood that any specific order or hierarchy of steps in the processes disclosed in FIG. 3 are illustrations of exemplary approaches. Based upon design preferences, it is understood that the specific order or hierarchy of steps in the processes may be rearranged, expanded, and some steps omitted. Some of the blocks may be performed simultaneously. For example, the action calculating the metrics may be performed before the "top N" processes filtering step. In another example, the validation of the probe application identity may be performed simultaneously with the validation of the data by the monitoring server.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A user device (UD), comprising:
   one or more processors;
   a network interface coupled to the one or more processors;
   a storage device for content and programming;
   a probe application stored in the storage device, wherein execution of the probe application by the one or more processors configures the UD to perform acts comprising:
   providing, by the probe application, timing information to an operating system of the UD, wherein the timing information provides instructions for the operating system to wake up the probe application from a sleep mode every first time period and every second time period;
   upon waking from the sleep mode every first time period:
      sending, by the probe application, a request to the UD to determine key performance indicators (KPI's) of a plurality of processes running on the UD;
      determining, by the probe application, a top predetermined number (N) processes of the plurality of processes that are using the most resources of the UD, based on the KPI's;
      discarding the KPI's of the plurality of processes that are not in the top N processes; and
      storing filtered metrics based on the KPI's of the top N processes in the storage device; and
   upon waking from the sleep mode every second time period:

retrieving, by the probe application, the stored filtered metrics, from the storage device;

sending a data package comprising the filtered metrics to a remote monitoring server for analysis and storage; and removing the filtered metrics from the storage device.

2. The UD of claim 1, wherein execution of the probe application further configures the UD to perform acts comprising, upon waking from the sleep mode every first time period:

determining a universal consumption factor (UCF) for each process in the top N processes, based on the KPI's of each process, wherein the filtered metrics comprise the KPI's and the UCF's of the processes in the storage device.

3. The UD of claim 2, wherein the UCF provides an aggregate performance assessment of a respective process running on the UD based on:

a process CPU time that the respective process uses the processor during the first time period;

a UD CPU time that the UD uses the processor during the first time period;

a process bytes of a total data sent and received by the respective process during the first time period; and a UD bytes of a total data sent and received by the UD during the first time period, wherein:

$$UCF = \left(\frac{\text{Process } CPU \text{ Time}}{UD \ CPU \text{ Time}}\right) \times 2 + \left(\frac{\text{Process Bytes}}{UD \text{ Bytes}}\right) \times \frac{1}{3}.$$

4. The UD of claim 1, wherein removing the filtered metrics from the storage device is in response to receiving a confirmation from the remote monitoring server that the filtered metrics were successfully stored in a data store.

5. The UD of claim 1, wherein the second time period is longer than the first time period.

6. The UD of claim 1, wherein the data package further comprises identification (ID) information of the UD.

7. The UD of claim 6, wherein:

the data package further comprises identification information of each included process, the identification information of each included process comprising:

a package identifier;

a name of the process;

a version code; and a version name.

8. The UD of claim 1, wherein execution of the probe application further configures the UD to perform acts comprising:

receiving, based on the sent data package, a notification from the remote server indicating which one or more processes of the top N processes are at least one of inefficient and malfunctioning.

9. The UD of claim 8, wherein the notification includes a suggestion to replace the one or more processes of the top N processes that are at least one of inefficient and malfunctioning, with one or more applications that are less resource intensive than the one or more processes of the top N processes.

10. The UD of claim 1, wherein execution of the probe application further configures the UD to perform acts comprising, upon waking from the sleep mode every first time period:

comparing the top N processes to a lookup table having a list of exception processes, wherein the lookup table is stored in the storage device; and discarding the KPI's of the processes that are in the lookup table.

11. A method for application diagnostics of processes running on a user device (UD), the method comprising:

providing, by a probe application, timing information to an operating system of the UD, wherein the timing information provides instructions for the operating system to wake up the probe application from a sleep mode every first time period and every second time period;

upon waking from the sleep mode every first time period:

sending, by the probe application, a request to the UD to determine key performance indicators (KPI's) of a plurality of processes running on the UD;

determining, by the probe application, a top predetermined number (N) processes of the plurality of processes that are using the most computing resources, based on the KPI's;

discarding the KPI's of the processes that are not in the top N processes;

storing filtered metrics based on the KPI's of the top N processes in a local memory; and entering, by the probe application, into the sleep mode; and upon waking from the sleep mode every second time period:

retrieving, by the probe application, the filtered metrics of every iteration of the first time period from the local memory;

sending a data package comprising the filtered metrics to a remote monitoring server for analysis and storage;

removing the filtered metrics from the local memory; and entering, by the probe application, into the sleep mode.

12. The method of claim 11, further comprising, upon waking from the sleep mode every first time period:

determining a universal consumption factor (UCF) for each process in the top N processes, based on the KPI's of each process, wherein the filtered metrics comprise the KPI's and the UCF's of the processes stored in the memory.

13. The method of claim 12, wherein the UCF provides an aggregate performance assessment of a respective process running on the UD based on:

a process CPU time that the respective process uses a processor of the UD during the first time period;

a UD CPU time that the UD uses the processor during the first time period;

a process bytes of a total data sent and received by the respective process during the first time period; and a UD bytes of a total data sent and received by the UD during the first time period, wherein:

$$UCF = \left(\frac{\text{Process } CPU \text{ Time}}{UD \ CPU \text{ Time}}\right) \times 2 + \left(\frac{\text{Process Bytes}}{UD \text{ Bytes}}\right) \times \frac{1}{3}.$$

14. The method of claim 11, wherein the data package further comprises identification (ID) information of the UD.

15. The method of claim 14, wherein:
the data package further comprises identification information of each included process, the identification information of each included process comprising:
a package identifier;
a name of the process;
a version code; and
a version name.

16. The method of claim 11, further comprising receiving, based on the sent data package, a notification from the remote server indicating which one or more processes of the top N processes are at least one of inefficient and malfunctioning.

17. A non-transitory computer-readable medium having stored thereon a plurality of sequences of instructions which, when executed by one or more processors of a user device (UD), cause the one or more processors to direct a probe application to:
provide timing information to an operating system of the UD, wherein the timing information provides instructions for the operating system to wake up the probe application from a sleep mode every first time period and every second time period;
upon waking from the sleep mode every first time period: send a request to the UD to determine key performance indicators (KPI's) of a plurality of processes running on the UD;
determine a top predetermined number (N) processes of the plurality of processes that are using the most resources of the UD, based on the KPI's;
discard the KPI's of processes of the plurality of processes that are not in the top N processes; and
determine a universal consumption factor (UCF) for each process in the top N processes based on the KPI's of each process, wherein the UCF provides an aggregate performance assessment of a respective process running on the UD based on: (i) a process CPU time that the respective process uses the one or more processors during the first time period, (ii) a UD CPU time that the UD uses the one or more processors during the first time period, (iii) a process bytes of a total data sent and received by the respective process during the first time period, and (iv) a UD bytes of a total data sent and received by the UD during the first time period; and
store filtered metrics based on the KPI's and the UCFs of the top N processes in a storage device of the UD; and
upon waking from the sleep mode every second time period:
retrieve the stored filtered metrics from the storage device;
send a data package comprising the filtered metrics to a remote monitoring server for analysis and storage; and
remove the filtered metrics from the storage device.

18. The non-transitory computer-readable medium of claim 17, wherein the second time period is longer than the first time period.

19. The non-transitory computer-readable medium of claim 17, wherein the data package further comprises identification (ID) information of the UD.

20. The non-transitory computer-readable medium of claim 19, wherein:
the data package further comprises identification information of each included process, the identification information of each included process comprising:
a package identifier;
a name of the process;
a version code; and
a version name.

* * * * *